US006765702B2

(12) United States Patent
Tang et al.

(10) Patent No.: US 6,765,702 B2
(45) Date of Patent: Jul. 20, 2004

(54) OPTICAL IMAGE AND TRANSMISSION COMPOSITE ASSEMBLY

(75) Inventors: Tom Tang, Hsin Chu (TW); Ta Yi Lee, Taipei Hsien (TW); Lung Chen, Taipei Hsien (TW)

(73) Assignee: Lite-On Technology Corporation, Taipei (TW)

( * ) Notice: Subject to any disclaimer, the term of this patent is extended or adjusted under 35 U.S.C. 154(b) by 646 days.

(21) Appl. No.: 09/835,137

(22) Filed: Apr. 16, 2001

(65) Prior Publication Data

US 2002/0149803 A1 Oct. 17, 2002

(51) Int. Cl.$^7$ ................................................. H04N 1/04
(52) U.S. Cl. ....................................... 358/497; 474/471
(58) Field of Search ............................... 358/497, 494, 358/474, 471, 400, 483, 482, 505, 512–514; 382/312, 318, 319; 399/211; 318/696, 685; 250/208.1, 234–236; 359/212

(56) References Cited

U.S. PATENT DOCUMENTS

| 6,246,492 | B1 | * | 6/2001 | Chang et al. | 358/497 |
|---|---|---|---|---|---|
| 6,330,084 | B1 | * | 12/2001 | Chiang | 358/497 |
| 6,335,802 | B1 | * | 1/2002 | Hung-Che et al. | 358/296 |
| 6,473,206 | B1 | * | 10/2002 | Fujimoto et al. | 358/497 |
| 6,626,360 | B2 | * | 9/2003 | Huang | 235/454 |
| 6,667,469 | B2 | * | 12/2003 | Tregoning | 250/208.1 |

* cited by examiner

Primary Examiner—Cheukfan Lee
(74) Attorney, Agent, or Firm—Rosenberg, Klein & Lee (57) ABSTRACT

An optical image and transmission composite assembly comprises an optical module, a transmission unit and a guiding unit. The transmission unit and the guiding unit are arranged on the optical module, wherein the optical module is guided and moved by the engagement of a plurality of wheels and tooth bars, or by a female guiding stage and a male guiding stage fit with the female guiding stage. The assembling effort and cost of the scanner using the optical image and transmission composite assembly can be reduced.

7 Claims, 10 Drawing Sheets

OPTICAL IMAGE AND TRANSMISSION COMPOSITE ASSEMBLY

FIELD OF THE INVENTION

The present invention relates to an optical image and transmission composite assembly, especially to an image-input optical module provided with transmission unit for transmitting and guiding functions, thus modularizing the optical module and the transmission unit, and reducing cost.

BACKGROUND OF THE INVENTION

The flat bed image scanners are popular computer peripheral for scanning the text, chart or graphic from book or magazine into computer accessible data. The prior art flat bed image scanners generally comprise an image input means, a transmission unit, an image processing circuit, a transparent scanning window and a shell. The transmission unit occupies considerable space in the flat bed image scanner. Therefore, the improvement of transmission unit is important design issues for the flat bed image scanners.

Figure 1:
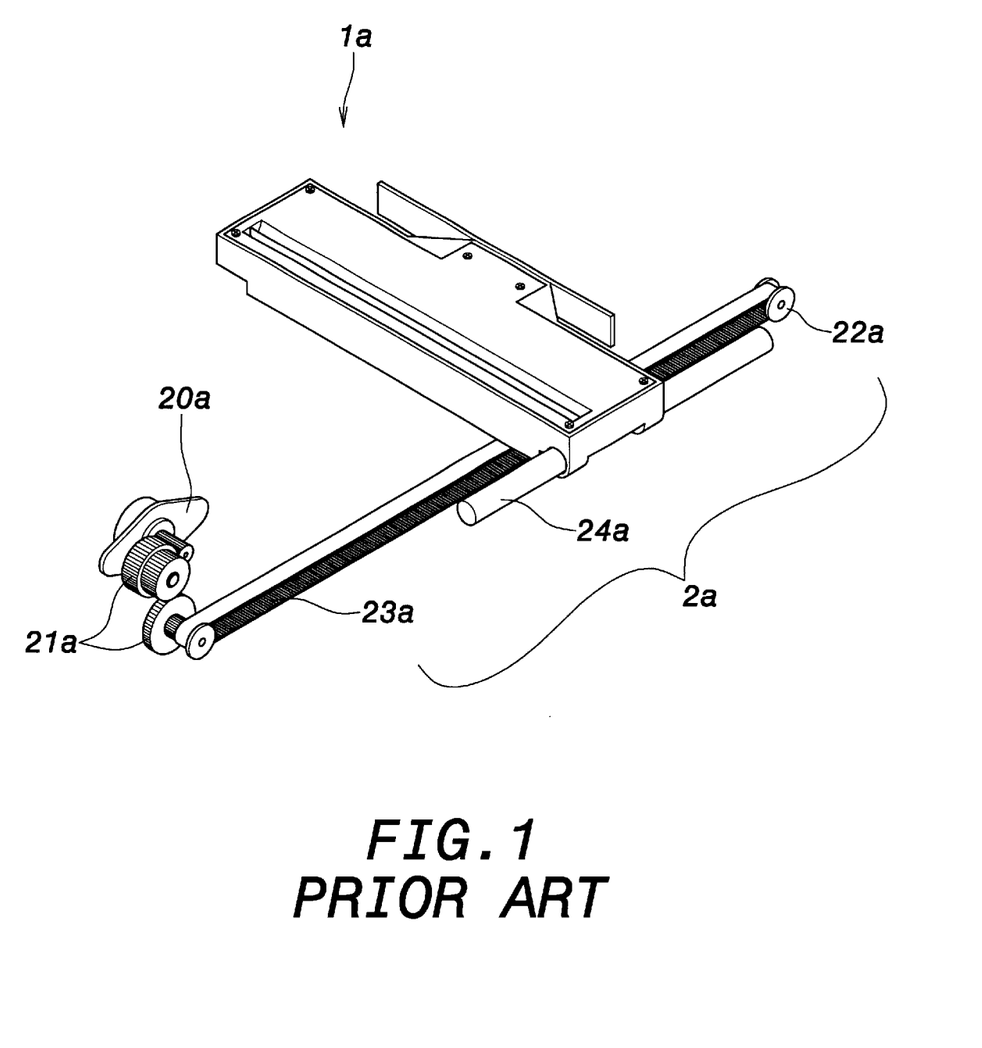
FIG. 1 shows the perspective view of a prior art image input means and a prior art transmission unit.

As shown in FIG. 1, a prior art image input means 1a generally comprises a light source, a reflection mirror set, a lens, and an image sensor (not shown). The transmission unit 2a generally comprises a stepper motor 20a, a wheel set 21a, a idler wheel 22a, a timing belt 23a and a sliding shaft 24a.

The operation principle of the flat bed image scanner is described as follows. The document to be scanned is placed atop the transparent scanning window and then illuminated by the light source of the image input means 1a. The reflected light from the document is then guided to the image sensor (not shown) by the reflection mirror set and the lens (both not shown). The image sensor generates electrical signal corresponding to the received light and then sends the signal to the image processing circuit to digitize. After the image sensor (not shown) finishes scanning one row of image, the transmission unit 2a moves the image input means 1a next region to be scanned. Repeat said processes until all area of document has been scanned.

Moreover, as shown in FIG. 1, the stepper motor 20a and the wheel set 21a of the transmission unit 2a are retained on the shell of the flat bed image scanner. The wheel set 21a is located at one end of the timing belt 23a and driven by the timing belt 23a such that the image input means 1a is sliding along the sliding shaft 24a to complete the image scanning.

However, in above-mentioned flat bed image scanner, the image input means 1a and the transmission unit 2a are separately arranged and the transmission unit 2a are retained on the shell of the flat bed image scanner. Therefore, considerable space is wasted. Moreover, the flat bed image scanner is hard to disassemble and assemble.

SUMMARY OF THE INVENTION

It is the object of the present invention to provide an optical image and transmission composite assembly wherein the optical module is provided with transmission unit for transmitting and guiding functions, thus modularizing the optical module and the transmission unit, and reducing cost.

To achieve above object, the present invention provides an optical image and transmission composite assembly for a scanner. The optical image and transmission composite assembly comprises an optical module, a transmission unit and a guiding unit. The optical module has a light source, a reflection mirror set, a lens and an image sensor. The transmission unit has a stepper motor and is arranged on the optical module. The stepper motor has a driving wheel engaged to a first driven wheel and the first driven wheel is engaged to a tooth bar. The guiding unit has a second driven wheel engaged to the first driven wheel and also engaged to another tooth bar.

In another aspect of the invention, the guiding unit has a female guiding stage and a male guiding stage fit with the female guiding stage, and is functioned to guide the optical module.

The various objects and advantages of the present invention will be more readily understood from the following detailed description when read in conjunction with the appended drawing, in which:

DETAILED DESCRIPTION OF THE INVENTION

Figure 2:
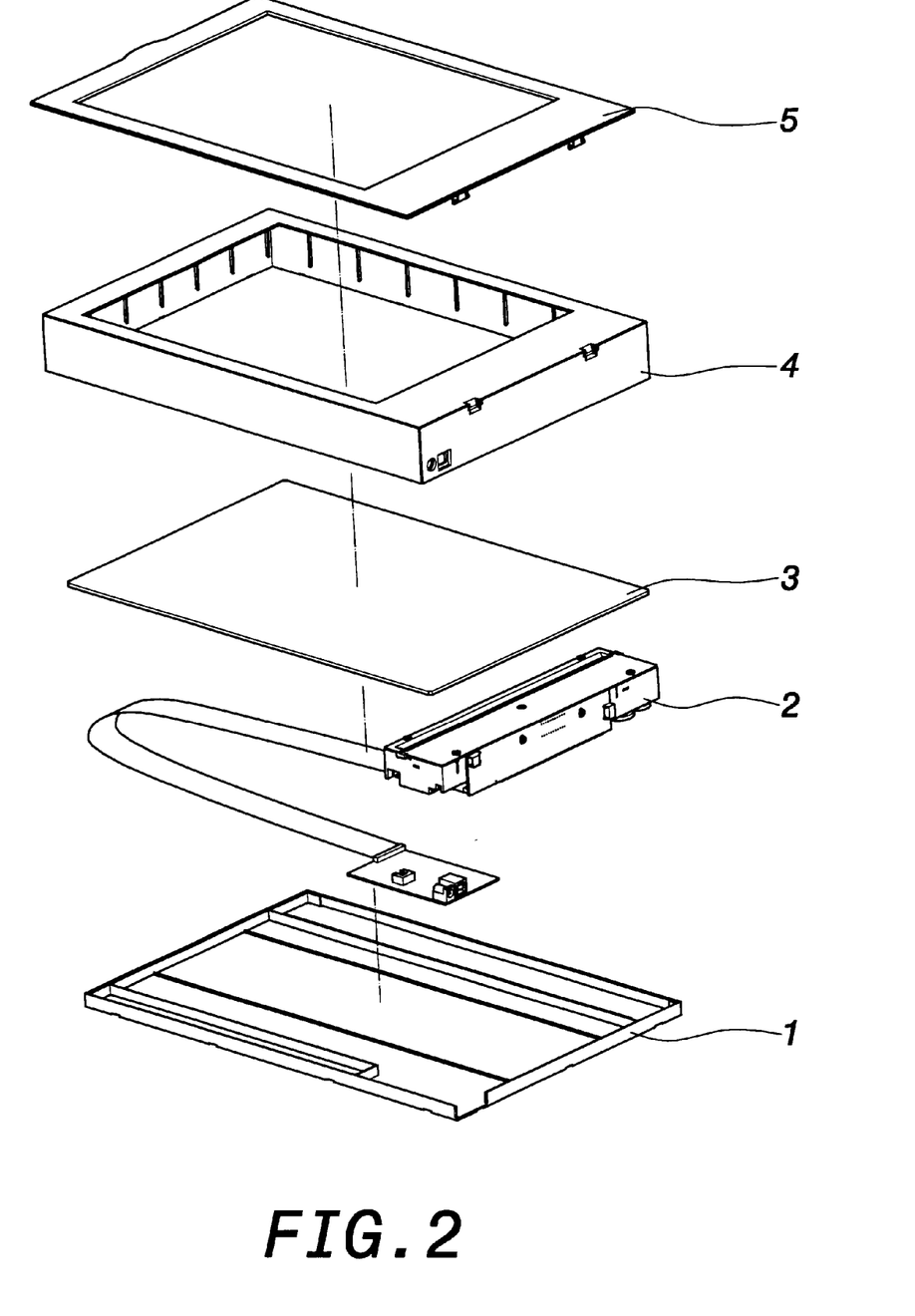
FIG. 2 shows the explosive view of the scanner of present invention.

FIG. 2 shows the explosive view of the present invention; the scanner according to the present invention comprises a base 1, an optical image and transmission composite assembly 2, an image processing circuit (not shown), a transparent scanning window 3, a shell 4 and a top cover 5. In the present invention, the image input optical module and the transmission unit are integrated to form an image input optical and transmission composite module 2.

Figure 3:
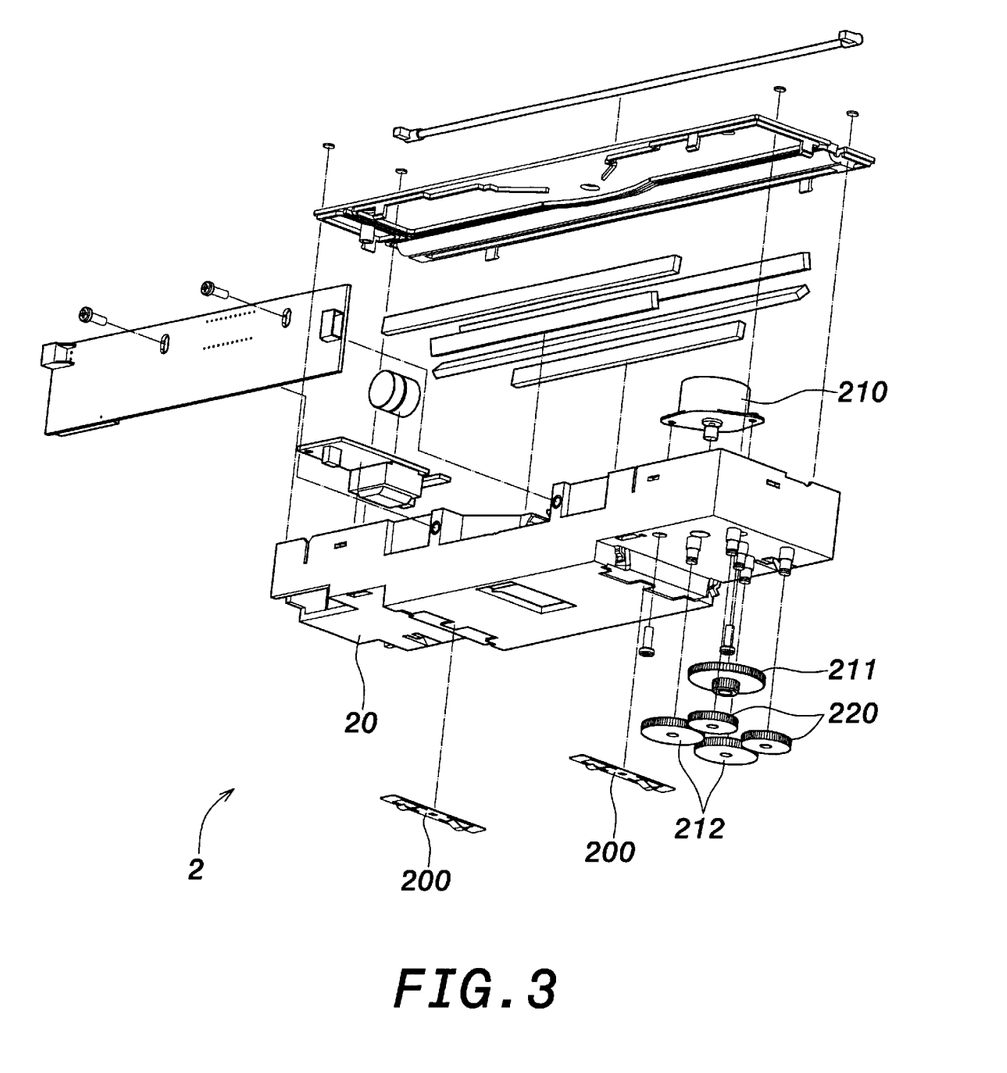
FIG. 3 shows the explosive view of the first preferred embodiment of the present invention.
Figure 4:
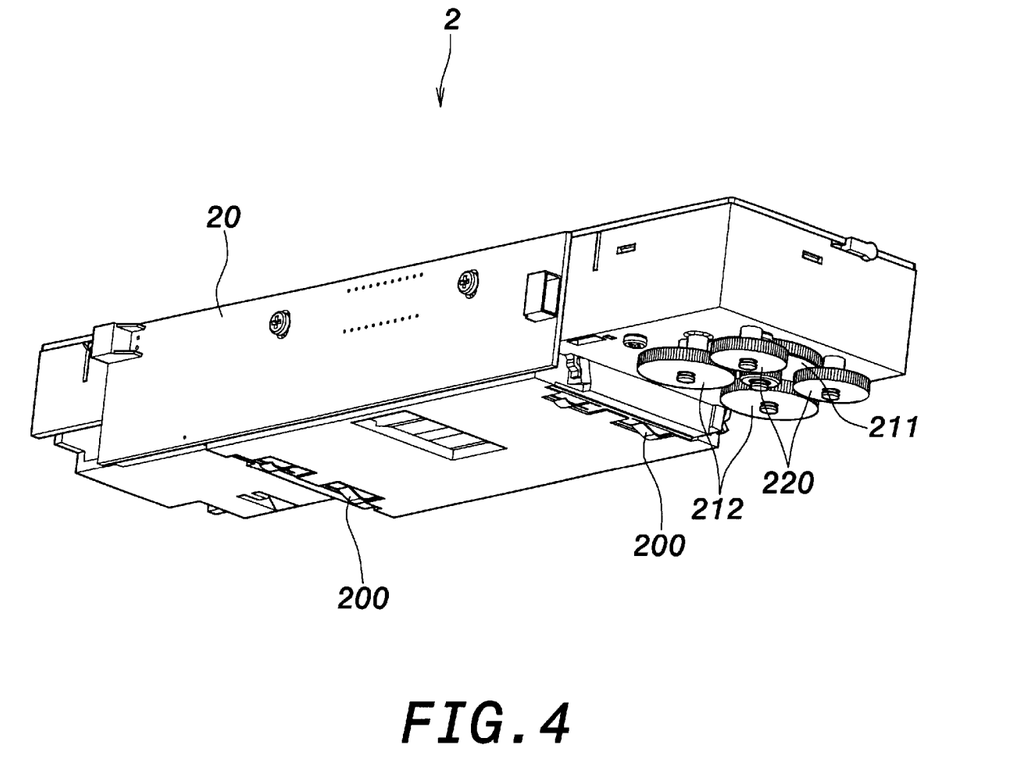
FIG. 4 shows the perspective view of the first preferred embodiment of the present invention.
Figure 5:
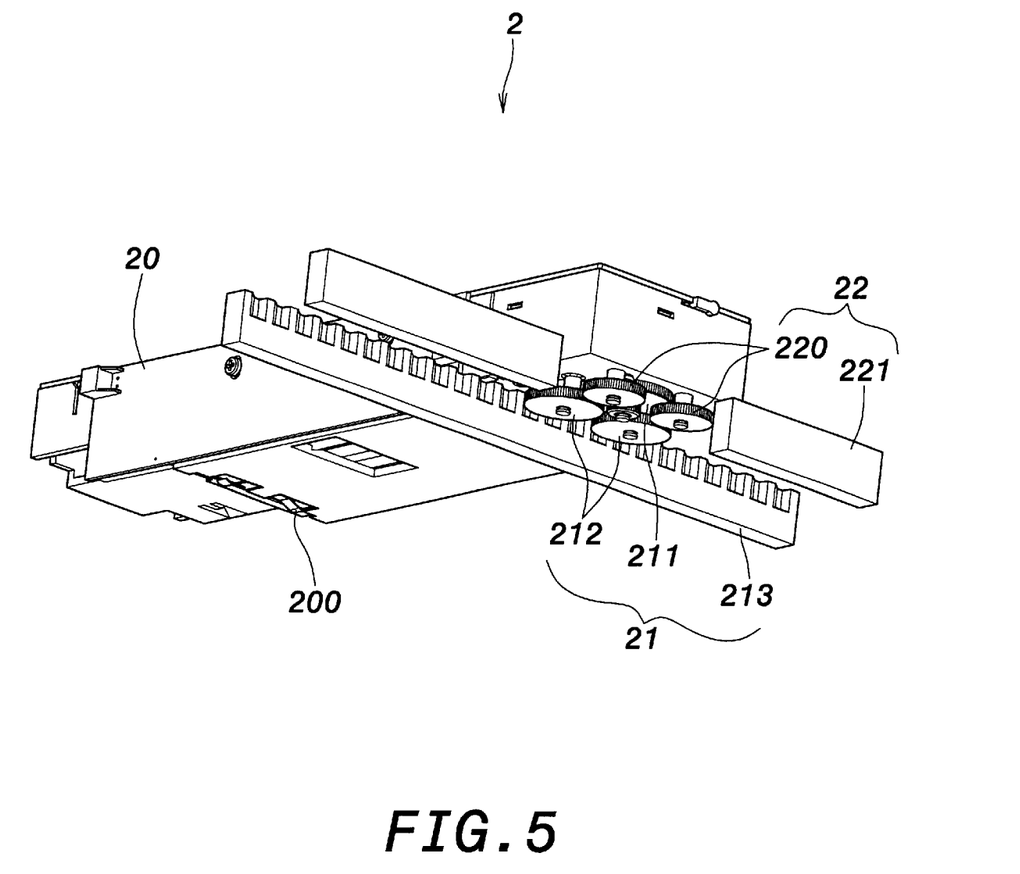
FIG. 5 shows the transmission unit and the guiding unit of the first preferred embodiment of the present invention.

FIGS. 3 and 4 show the explosive and perspective views of the first preferred embodiment of the present invention, respectively. The optical image and transmission composite assembly 2 comprises an optical module 20 and a transmission unit 21 and a guiding unit 22, which are arranged on one side or both sides of the optical module 20, as shown in FIG. 5.

The optical module 20 comprises a light source, a reflection mirror set, a lens and an image sensor (not shown), and a resilient member 200 on both bottom lateral sides of the optical module 20. The resilient members 200 are rested against the projecting rail (not shown) on the base 1. The optical module 20 also has resilient member (not shown) on topside thereof. The resilient member 200 moves along the transparent scanning window 3 and the base 1 such that the structure of the optical module is stable. The optical module 20 has similar structure as that of prior art and is not described in detail here.

Figure 6:
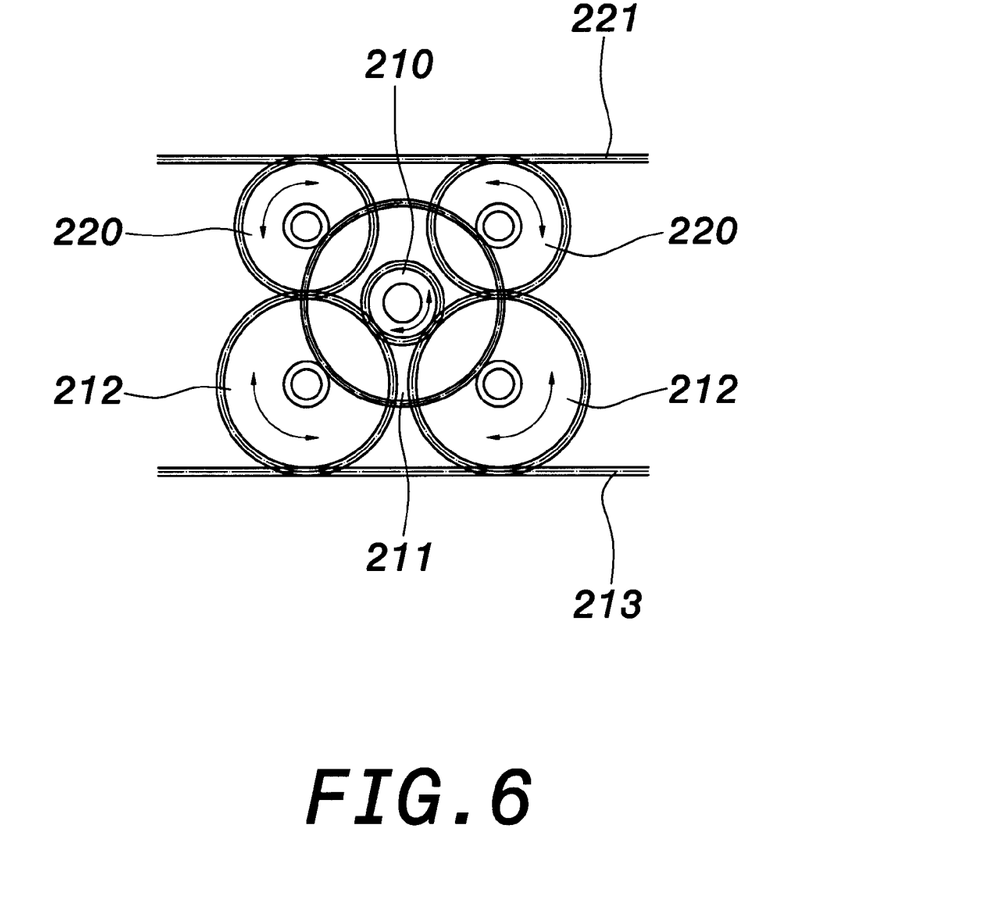
FIG. 6 shows the transmission operation of the first preferred embodiment of the present invention.

The transmission unit 21 comprises a stepper motor 210 arranged on the optical module 20 and the stepper motor 210 is connected to a driving wheel 211, which is engaged with two first driven wheels 212 aligned in Y-direction. Moreover, the two first driven wheels 212 are engaged to a tooth bar 213 extended in Y-direction as shown in FIG. 5. Moreover, the guiding unit 22 has two second driven wheels 220 aligned in Y-direction and engaged to the two first driven wheels 212 in X-direction. Moreover, the two second driven wheels 220 are engaged to a tooth bar 221 extended in Y-direction as shown in FIG. 5. As shown in FIG. 6, the two first driven wheels 212 are linked to the tooth bar 213 and the two second driven wheels 220 are linked the tooth bar 221, thus enabling the optical module 20 in shuttle motion and guiding the optical module 20. Moreover, one of the second driven wheel 220 and the tooth bar 221 has resilient member (not shown) to provide translational tolerance. The overall structure of the optical image and transmission composite assembly 2 has lateral balance.

Figure 7:
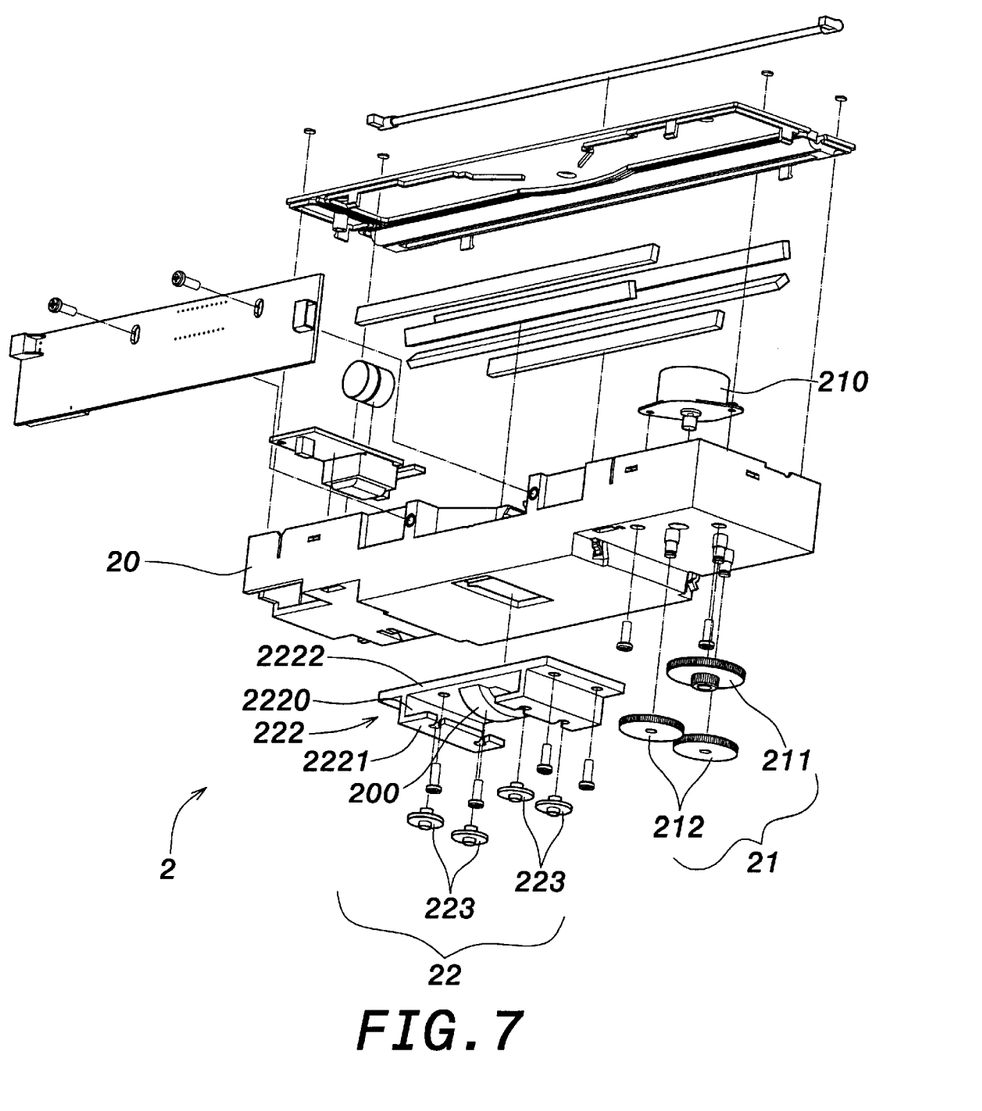
FIG. 7 shows the explosive view of the second preferred embodiment of the present invention.
Figure 8:
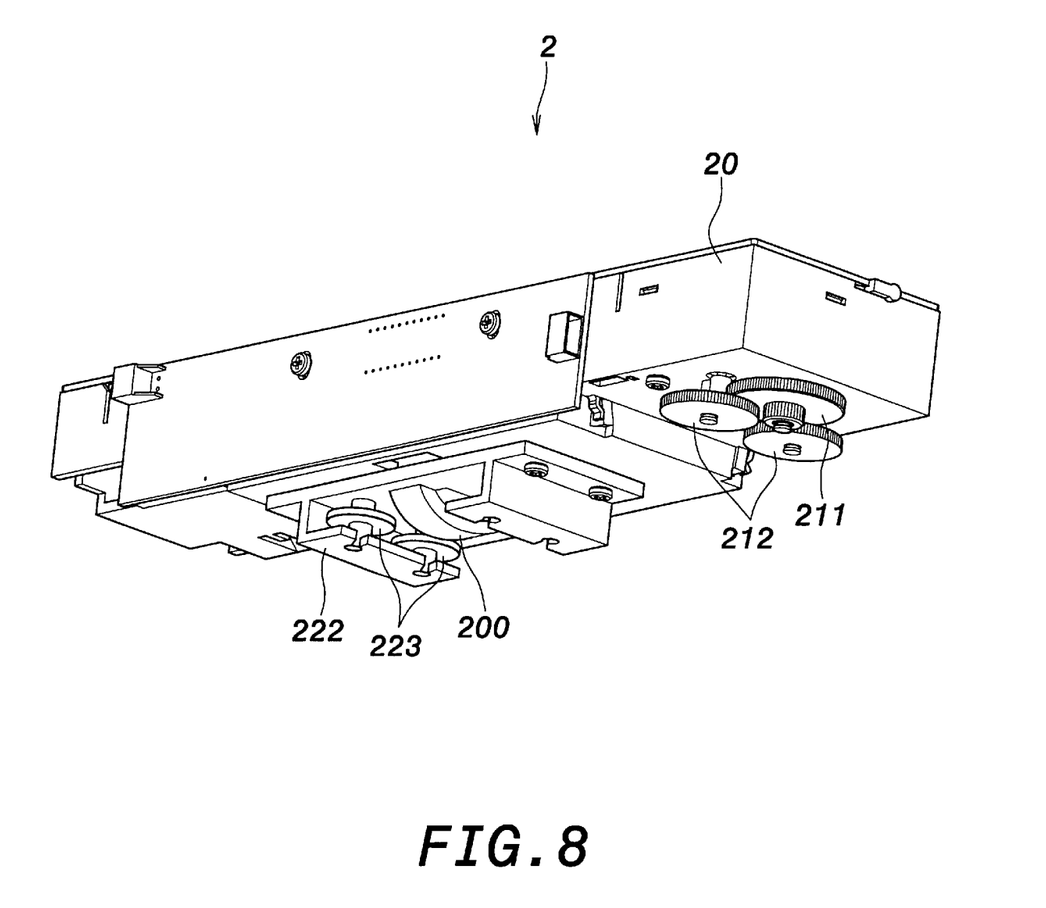
FIG. 8 shows the perspective view of the second preferred embodiment of the present invention.

FIGS. 7 and 8 show the explosive and perspective views of the second preferred embodiment of the present invention, respectively. The optical image and transmission composite assembly 2 comprises an optical module 20 and a transmission unit 21, which are arranged on one side or both sides of the optical module 20, and a guiding unit 22 arranged on center of the optical module 20.

The optical module 20 comprises a light source, a reflection mirror set, a lens and an image sensor (not shown), and a resilient member 200 on bottom side of the optical module 20. The optical module 20 also has resilient member (not shown) on topside thereof. The resilient member 200 moves along the transparent scanning window 3 and the base 1 such that the optical module has stable structure. The optical module 20 has similar structure as that of prior art and is not described in detail here.

Figure 9:
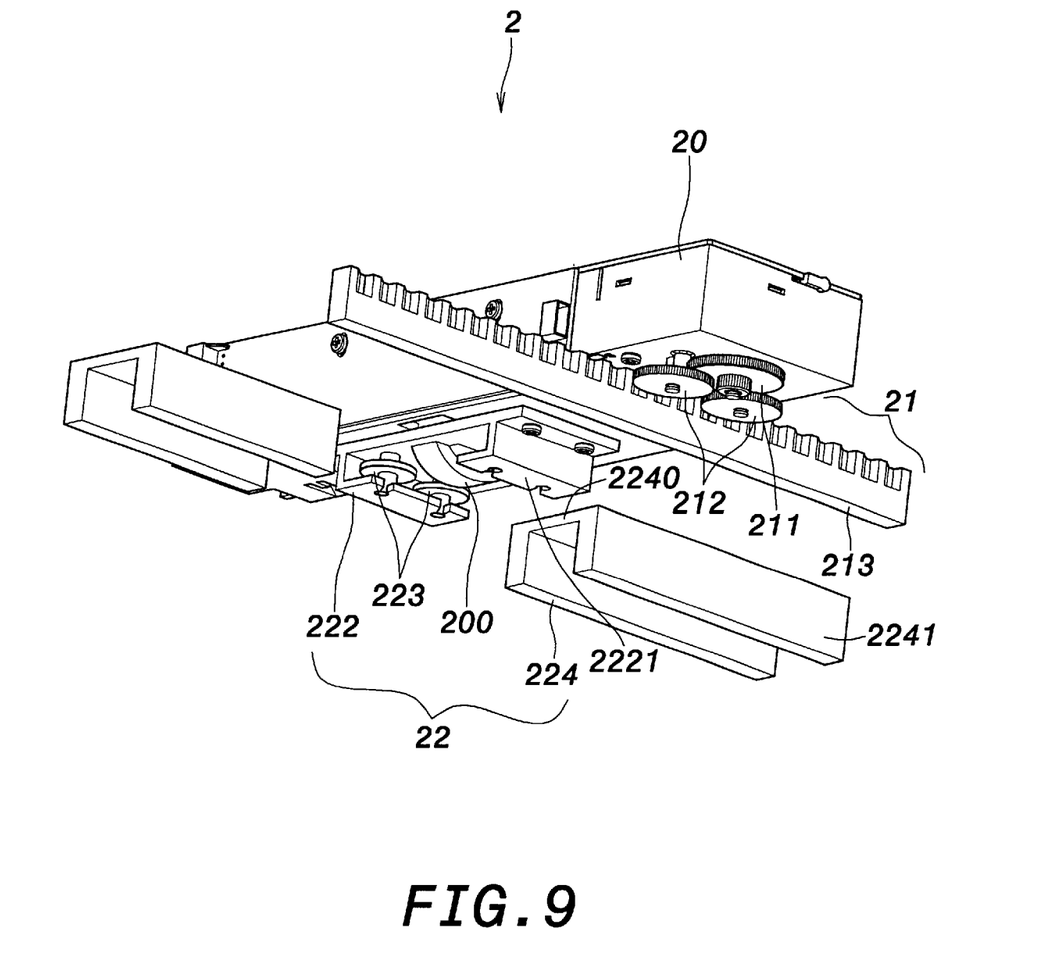
FIG. 9 shows the transmission unit and the guiding unit of the second preferred embodiment of the present invention.
Figure 10:
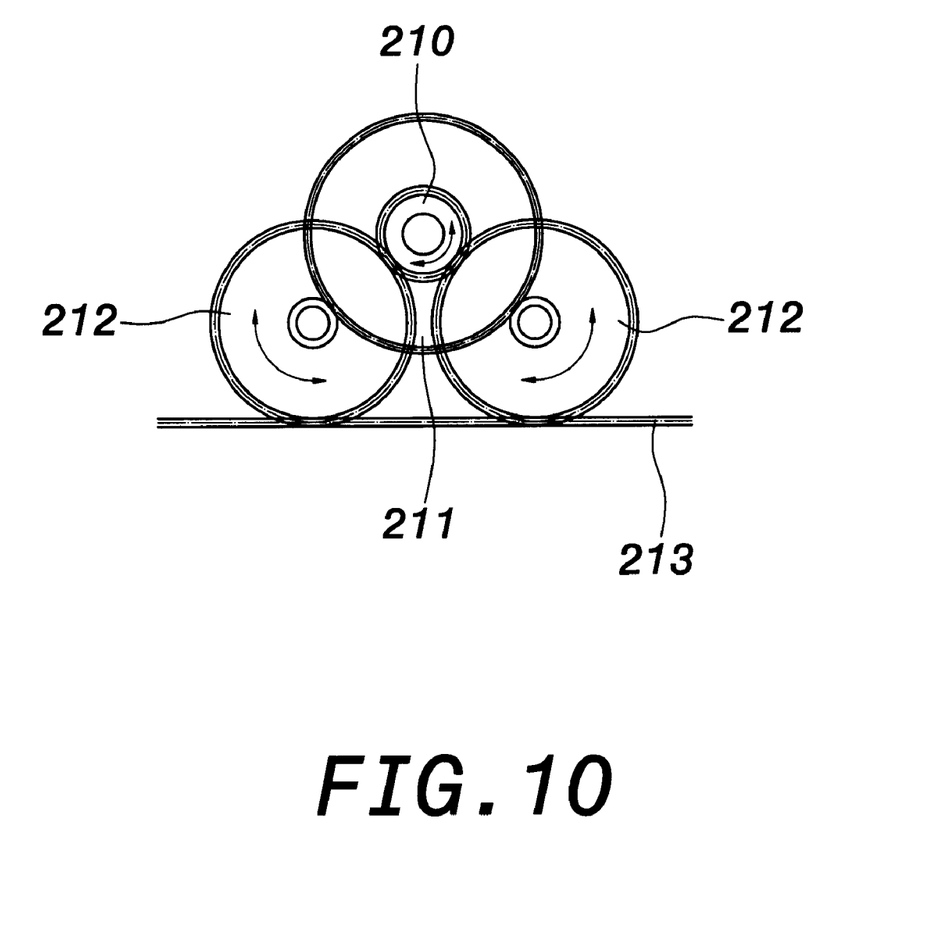
FIG. 10 shows the transmission operation of the second preferred embodiment of the present invention.

The transmission unit 21 comprises a stepper motor 210 arranged on the optical module 20 and the stepper motor 210 is connected to a driving wheel 211, which is engaged with two first driven wheels 212 aligned in Y-direction. Moreover, the two first driven wheels 212 are engaged to a tooth bar 213 extended in Y-direction as shown in FIG. 9. As shown in FIG. 10, the two first driven wheels 212 are linked to the tooth bar 213, thus enabling the optical module 20 in shuttle motion and guiding the optical module 20.

Moreover, the guiding unit 22 has a female guiding stage 222 and a male guiding stage 224 fit with the female guiding stage 222. The female guiding stage 222 is composed of a U-shaped groove 2220 and two bottom plates 2221 extended inwardly from both sides of the U-shaped groove 2220. A plurality of retractable wheels 223 is provided between the two bottom plates 2221 and the top plate 2222. Due to the flexibility of the retractable wheels 223, the overall structure of the optical image and transmission composite assembly 2 has lateral balance. Moreover, a resilient member 200 is provided through center of the top plate 2222. The male guiding stage 224 has a top surface 2240 and two lateral walls 2241 extended downward from both sides of the top surface 2240. The top surface 2240 is functioned as the sliding rail of the resilient member 200 and the two lateral walls 2241 provide clamping force to the retractable wheels 223 such that the optical module 20 has guided movement.

To sum up, the image-input optical and transmission composite assembly of the present invention has following advantages:

(1) Modularized design: integrating the image input means and the transmission unit into a single module.

(2) No transmission belt: directly engaging the transmission unit on the optical module to the tooth bar inject molding on the bottom cover to eliminate the use of transmission belt.

(3) No sliding shaft: the resilient member arranged on the optical module providing horizontal and vertical balance for the optical module, thus eliminating the use of sliding shaft.

(4) Easy maintenance: the design and structure of the image-input optical and transmission composite assembly having easy maintenance advantage.

(5) Optimized volume: the transmission unit directly mounted on the optical module and circuit board can be mounted on lateral space of the optical module to optimized space usage.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. An optical image and transmission composite assembly for a scanner having at least a base and a transparent scanning window, the optical image and transmission composite assembly comprising an optical module having a light source, a reflection mirror set, a lens and an image sensor;

a transmission unit having a stepper motor and arranged on the optical module, the stepper motor having a driving wheel engaged to a first driven wheel and the first driven wheel engaged to a tooth bar;

a guiding unit having a second driven wheel engaged to the first driven wheel and also engaged to another tooth bar.

2. The optical image and transmission composite assembly as in claim 1, wherein the optical module has at least one resilient member on bottom thereof, and the resilient member is movable along the base and the transparent scanning window of the scanner.

3. The optical image and transmission composite assembly as in claim 1, wherein at least one of the wheel and tooth bar of the guiding unit has a resilient member.

4. An optical image and transmission composite assembly for a scanner having at least a base and a transparent scanning window, the optical image and transmission composite assembly comprising an optical module having a light source, a reflection mirror set, a lens and an image sensor;

a transmission unit having a stepper motor and arranged on the optical module, the stepper motor having a driving wheel engaged to a first driven wheel and the first driven wheel engaged to a tooth bar;

a guiding unit having a female guiding stage and a male guiding stage fit with the female guiding stage, the female guiding stage being locked on bottom of the optical module and the male guiding stage having a top surface and two lateral walls extended downward from both sides of the top surface.

5. The optical image and transmission composite assembly as in claim 4, wherein the optical module has at least one resilient member on bottom thereof, and the resilient member is movable along the base and the transparent scanning window of the scanner.

6. The optical image and transmission composite assembly as in claim 4, wherein the female guiding stage is composed of a top plate, a U-shaped groove and two bottom plates extended inwardly from both sides of the U-shaped groove; a plurality of retractable wheels provided between the two bottom plates and the top plate and clamped by the lateral walls.

7. The optical image and transmission composite assembly as in claim 4, wherein a resilient member is provided through center of the top plate of the female guiding stage and abuts the top surface of the male guiding stage.

* * * * *